Sept. 13, 1932.  W. R. COLLINGS  1,877,270

MANUFACTURE OF A COMPOSITE SHEET

Filed June 3, 1929

INVENTOR
BY William R. Collings
Thomas Griswold, Jr.
ATTORNEY

Patented Sept. 13, 1932

1,877,270

UNITED STATES PATENT OFFICE

WILLIAM R. COLLINGS, OF MIDLAND, MICHIGAN, ASSIGNOR TO THE DOW CHEMICAL COMPANY, OF MIDLAND, MICHIGAN, A CORPORATION OF MICHIGAN

MANUFACTURE OF A COMPOSITE SHEET

Application filed June 3, 1929. Serial No. 368,190.

The present invention relates to a method of forming a composite sheet and in particular to a method of treating or moistening the material during its manufacture so that a more intimate contact may be had between its components.

Heretofore in the manufacture of a composite sheet the general practice where making a two ply reenforced sheet has been to coat the adjacent faces of the two sheets with adhesive and then to pass them with reenforcement therebetween through squeezing or sealing rolls, the same method being applied where the composite sheet contains more than two plies. Such practice, however, I have found does not permit the paper and adhesive to give sufficiently to allow the adhesive to form as good a bond between the components of the sheet as may be obtained where the sheet is treated or moistened according to my improved process.

The principal object of my invention is accordingly to provide a method of forming a composite sheet to permit a better union of the components thereof. Other objects and advantages will appear as the description proceeds.

To the accomplishment of the foregoing and related ends the invention, then, consists of the method hereinafter fully described and particularly pointed out in the claims, the annexed drawing and the following description setting forth in detail several modes of carrying out the invention, such disclosed modes illustrating, however, but several of various ways in which the invention may be used.

In said annexed drawing:—

Figure 1:
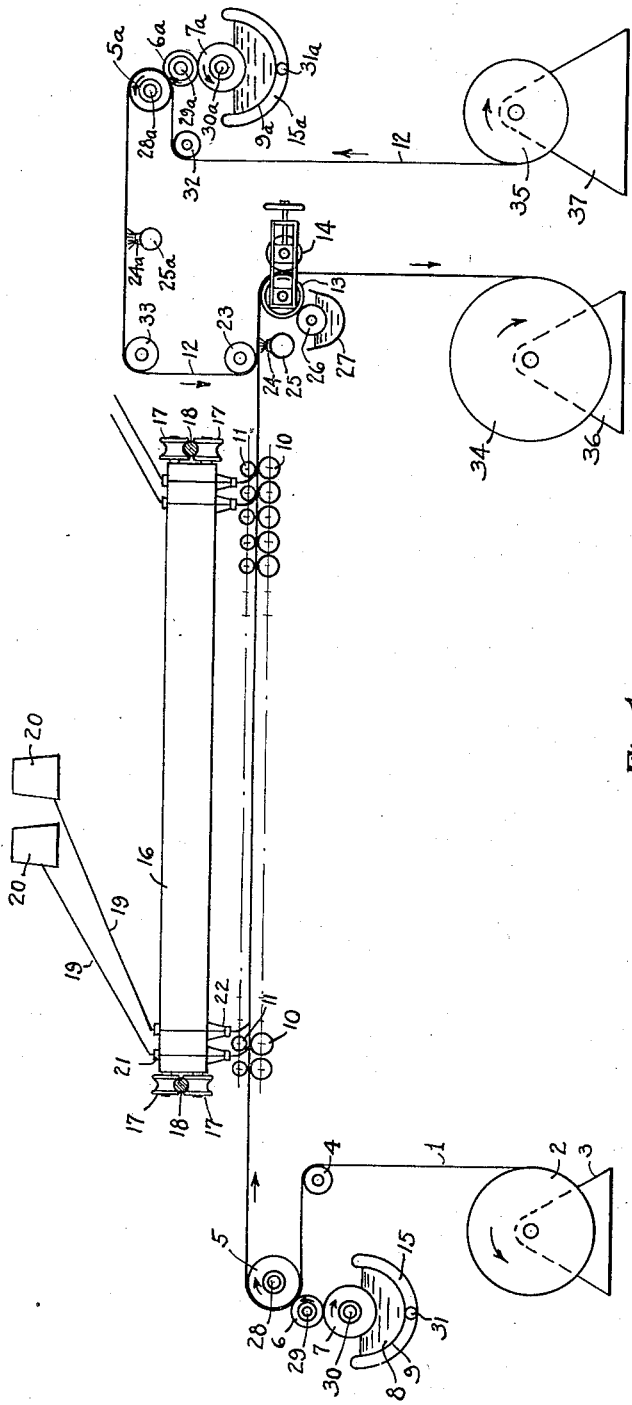
Figure 2:
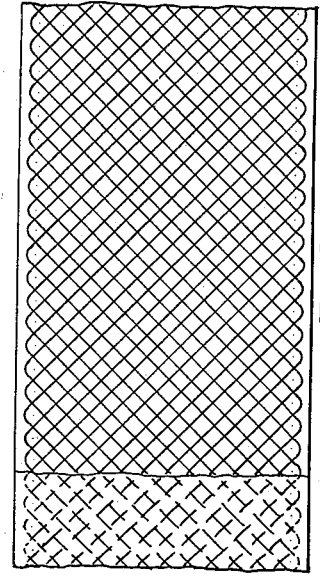

Fig. 1 is a diagrammatic side view of one preferred type of apparatus for carrying out the present invention; Fig. 2 illustrates one type of reinforced sheet produced by the machine diagrammatically shown in Fig. 1.

In general, my improved process includes temporarily softening at least one of the paper sheets of a composite sheet prior to passing said composite sheet through the final pair of squeezing or sealing rolls. For instance, where forming a composite sheet utilizing two sheets of crepe paper, 12 pound jute yarn for reenforcing and asphalt having a penetration factor of 35 as adhesive, I prefer to proceed as follows. Both sheets of the crepe paper are arranged to pass over rolls that will apply adhesive to one side of each sheet only. The so treated sheets are then brought together, with adhesive coated faces adjacent, simultaneous with the insertion of jute yarn reenforcing therebetween, the yarn being diagonally applied in two layers crossing each other and both being at substantially the same angle from respective edges of the sheet, the strands of yarn in each ply being placed approximately parallel and about $\frac{7}{16}$ of an inch apart. A square or diamond shaped mesh is thereby formed with said yarn. The sheets coated with adhesive, having been brought together with the reenforcing therebetween, are passed through a pair of squeezing or sealing rolls that squeeze the adhesive around the reenforcing yarn and into the surface of the paper. However, prior to passing the composite sheet through the squeezing rolls I subject at least one sheet of the paper thereof to a softening process as by blowing wet steam onto the back or uncoated side of such sheet so as to soften the paper slightly which enables the squeezing rolls to depress the so softened paper through the openings between the reenforcing yarns into a very intimate adhesive contact with the yarn and the sheet on the other side thereof. I have found that where my so treated and formed composite sheet is used for making bags, such for instance as used for packaging flake calcium chloride in 100 pound lots, the so made bag will withstand in some cases twice as many drops of 40 inches each than will a similar bag made out of the same materials but not so treated before the final sealing step. This improved characteristic is due to the better union of the paper sheets with each other and the reenforcing material. At least one of the squeezing rolls may be of a soft resilient character or a resilient sheet may be run between it and the softened paper. Such facilities will aid in pressing the softened sheet into intimate contact with the opposite sheet and with the yarn or other reenforcement.

Referring more particularly to the drawing, Fig. 1 shows in diagrammatic manner one of many combinations of apparatus suitable for carrying out the present invention. In operating this apparatus a sheet 1 is drawn from supply roll 2 supported in any suitable manner as by a standard 3. The sheet leaving roll 2 passes over an idler roll 4 and thence around roll 5 where a coat of adhesive is applied on one side thereof. The sheet then passes between two series of rollers 10 and 11 where reinforcing yarn strands 19 are placed on the adhesive-coated face of the sheet. A second sheet 12 is then placed over the reinforcing strands carried on the adhesive-coated face of sheet 1 and the whole is passed between squeeze rollers 13 and 14 where the sheet is consolidated into final form, following which it may be delivered directly to a point of use or rolled up as shown. The application of adhesive to one face of sheet 1 can be conveniently taken care of as follows:—Roll 7 dips in a bath of adhesive 8 contained in trough 9 or the like, rotation of roller 7 carrying a film of adhesive to roll 6, the relatively close spacing of roll 6 to roll 7 determining the thickness of the adhesive layer carried on the face of roll 6 into contact with sheet 1 passing around roll 5. Where the adhesive is of an asphalt base type, rollers 5, 6, and 7, as well as trough 9, are steam heated, the rollers being made hollow with steam entrance through the trunnions 28, 29, and 30 thereof. The adhesive-containing trough 9 is likewise heated by means of a steam jacket 15 or its equivalent through connection 31. The adhesive on sheet 1 after leaving roll 5 is either dried, or cooled in the case of hot asphalt or the like, so that when it reaches rollers 10 and 11 any tendency to stick to rollers 11 will be reduced to a negligible point although it is preferable to have a slight amount of stickiness left so that when the yarn strands are placed thereon they will be held in place and carried thereby. While the yarn strands or other reinforcing material can be applied to the adhesive-coated face of sheet 1 in any convenient manner, I prefer to apply same in the form of strands which are diagonally laid in two plies one over the other by means of a mechanism of the type diagrammatically shown. This mechanism functions as follows:—Carriage 16 is equipped with rollers 17 on each end thereof, such rollers engaging tracks 18 in such manner that the carriage can be moved backward and forward across sheet 1 and in a path directly thereabove and stopping just short of reaching the respective edges thereof. The mechanism for continuously bringing the carriage 16 back and forth across the face of sheet 1 in uniform manner may be of any conventional type (not shown). Yarn strands 19 used for reinforcing the composite sheet may be drawn from any suitable source of supply, such, for instance, as spools 20. A yarn strand 19 after leaving the spool 20 passes through a guide eyelet 21 at the upper edge of carriage 16 and thence to another guide eyelet 22 which delivers the yarn strand under roll 11 which extends entirely across the sheet and presses the yarn strand onto the adhesive-coated face of sheet 1. By making carriage 16 approximately twice as long (end eyelet to end eyelet) as the sheet being reinforced is wide and having it move across the sheet at the same rate of speed that the sheet is travelling lengthwise, the yarn will be laid at an angle of approximately 45° from the edge of the sheet, in two layers, one above the other in unwoven manner, as is shown in Fig. 2. Sheet 12 which is brought into contact with the adhesive-coated and reinforced face of sheet 1 by means of idler roll 23 may have the face that comes adjacent to the reinforcing material coated, if desired, with adhesive in similar manner to the coating of one face of sheet 1. The components of the sheet, as before mentioned, then pass between squeeze rollers 13 and 14 which may be automatically or hand adjusted to the desired consolidation pressure. At least one of the squeeze rolls, for instance 13, may be desirably covered with a resilient coating such as a rubber facing. By operating in this manner, I have found that although a composite sheet can be made, it is not as strong and well bonded together as is desirable since the paper sheets have a certain amount of resiliency which causes them to pull apart slightly after leaving the squeeze rolls, the particular point of most difficulty occurring at the reinforcing yarns. This difficulty I have found can be substantially eliminated by the application of a small amount of moistening agent, specifically a few per cent, to the back of at least one of the adhesive-coated sheets prior to applying the final squeezing or consolidation pressure to the reenforced composite sheet. For instance, wet steam may be blown onto the back of sheet 1 by means of nozzles 24 mounted on the valve controlled steam pipe 25. The amount of steam required is only enough to soften or slightly dampen the back of sheet 1 so that when it passes between squeeze rollers 13 and 14 its resiliency will have been reduced just to a point where it will not pull away from the opposite sheet after being consolidated. If desired, the back or unadhesive-coated face of sheet 12 can be treated in like manner by means of nozzle 24a connected to valve controlled wet steam pipe 25a. In some cases where steam is unavailable or undesirable for this specific use, the moisture may be applied, for instance, by sponging it unto the back or unadhesive-coated face of sheet 1, for instance, by dipping a roller 26 in a pan of water 27 and causing roller 26 to come in contact with the face of squeeze roll 13. Roll 13 under such conditions will take up a thin film of water and transfer it to sheet 1 so as to very slightly moisten same in equivalent manner to steaming. In some cases it may be desirable to both steam and sponge the back of at least one of the sheets, and in certain combinations the moistening could be advisedly done by one while the other acted as a standby for emergency use.

While I have described my invention employing steam to moisten the back of one sheet after applying adhesive but before passing through the squeezing rolls I do not wish to be limited to that mode only, as it is obvious that both sheets might be so moistened and in case an adhesive of the glue type should be used, moistening might even take place before the application of adhesive. In some cases, however, applying moisture to on sheet only would be preferable since such procedure would allow such sheet to give and form a satisfactory union between the components of the composite sheet without causing any or excessive depressions on the opposite side of the composite sheet thereby leaving that side flat and better adapted for applying label or printed matter. In some cases only one of the sheets will have adhesive applied thereto in which case if the adhesive is waterproof or semi-waterproof the back of the adhesive coated sheet will be moistened before sealing. The composite sheet may also contain more than two paper sheets and still retain the advantages of my invention by moistening the back of at least one of the outside sheets, preferably one adjacent to the reenforcement, prior to passing through the squeezing rolls. Such moistening in any case may be done by merely spraying, sponging, steaming or otherwise applying water directly to the sheet, steaming in some cases being preferable due to its furnishing a certain amount of heat simultaneously with the moistening, such heat tending to slightly soften the adhesive and thus facilitate the formation of a better union between the components of the composite sheet. In any case the amount of moistening agent, specifically water, used to temporarily soften at least one of the sheets is very small, in fact increasing the moisture content of dry paper which is normally 3 to 6 per cent, up to an approximate total of from 8 to 12 per cent is all that is necessary for satisfactory operation.

While I have further described my invention as applied to preparing a composite sheet utilizing, as reenforcement, two layers of diagonally laid parallel strands of yarn crossing each other, I do not wish to be limited to that construction since it will be obvious to anyone skilled in the art that the advantages of moistening may be attained where using other types of reenforcement such as fibres, burlap, scrim, cheesecloth or the like and that in some cases it may be even of advantage where no reenforcement is used. While in my so prepared composite sheet I prefer to use crinkled paper and asphalt adhesive having a penetration factor of from 30 to 40 I do not wish to be limited to them, since it is likewise obvious that other papers and adhesives may be used in equivalent manner depending upon the service required and other factors.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:—

1. In a method of the character described, the steps which consist in assembling a plurality of component sheets with reenforcement and adhesive therebetween, temporarily rarily softening at least one component thereof by treating the back of same with a low percentage of water prior to applying final pressure to consolidate the assembly.

2. In a method of the character described, the steps which consist in assembling a plurality of component sheets with reenforcement and adhesive therebetween and temposoftening at least one of the component sheets by slightly dampening the back of same, and then applying pressure to consolidate the assembly.

3. In the manufacture of a composite reinforced sheet, the step which consists in temporarily softening at least one component thereof with a small amount of moistening agent prior to applying final pressure to consolidate the composite sheet.

4. In the manufacture of a composite reinforced sheet, the step which consists in temporarily softening at least one of the component sheets by applying a small amount of moistening agent to the back thereof prior to applying final pressure thereto.

5. In the manufacture of an adhesively assembled composite reinforced sheet, the step which consists in steaming at least one of the component sheets thereof to slightly dampen same prior to applying final pressure to the assembly.

6. In the manufacture of a composite reinforced sheet, the step which consists in steaming the back of at least one of the adhesively coated component sheets thereof prior to applying final pressure to the assembly.

7. In the manufacture of a composite reinforced sheet, the step which consists in temporarily softening at least one of the component paper sheets thereof with a small amount of moistening agent prior to final assembly.

8. In a method of finishing a composite sheet composed of a plurality of layers of component sheets with reenforcement and adhesive therebetween, the step which consists in temporarily softening at least one of adhesive-coated component sheets by slightly moistening the back thereof before applying final pressure to the assembly.

9. In the manufacture of a composite sheet, the steps which consist in applying adhesive to adjacent faces of two component sheets, temporarily softening at least one such sheet by applying a few per cent of moisture to the back thereof, inserting reenforcing material and subjecting the so assembled composite sheet to pressure.

10. In the manufacture of a composite sheet, the steps which consist in applying adhesive to adjacent faces of two sheets, steaming the back of at least one such sheet, inserting reenforcing material and subjecting the so assembled composite sheet to pressure.

11. In the manufacture of a composite sheet, the steps which consist in applying an asphaltic adhesive to adjacent sides of two sheets, softening at least one such sheet by applying a small amount of moisture to the back thereof, inserting reenforcing material and passing the so assembled composite sheet through pressure sealing means.

12. In the manufacture of a composite sheet, the steps which consist in applying asphaltic adhesive having a penetration factor of approximately 35 to adjacent sides of two paper sheets, steaming the back of at least one such sheet, inserting reenforcing material and passing the so assembled composite sheet through pressure sealing means.

13. In the manufacture of a composite sheet, the steps which consist in applying adhesive to at least one face of two or more sheets of paper, moistening the back of at least one of the outer adhesive-coated sheets with a small amount of water, inserting reenforcing material and passing the so formed composite sheet through pressure sealing means.

Signed by me this 29th day of May, 1929.

WILLIAM R. COLLINGS.

CERTIFICATE OF CORRECTION.

Patent No. 1,877,270. September 13, 1932.

WILLIAM R. COLLINGS.

It is hereby certified that error appears in the printed specification of the above numbered patent requiring correction as follows: Page 2, line 10, for "on" read "to"; page 3, line 21, for "on" read "one"; line 89, claim 1, strike out the word "rarily"; and line 96, claim 2, for "tempo-" read "temporarily"; page 4, line 4, claim 8, after "of" insert the words "the said"; and that the said Letters Patent should be read with these corrections therein that the same may conform to the record of the case in the Patent Office.

Signed and sealed this 27th day of December A. D. 1932.

(Seal)

M. J. Moore,
Acting Commissioner of Patents.